(12) United States Patent
Kim et al.

(10) Patent No.: US 12,240,290 B2
(45) Date of Patent: Mar. 4, 2025

(54) HEAT PUMP SYSTEM FOR VEHICLE

(71) Applicant: ESTRA AUTOMOTIVE SYSTEMS CO., LTD., Daegu (KR)

(72) Inventors: Jong Won Kim, Daegu (KR); Ho Young Jang, Daegu (KR); Seong Yeob Lee, Daegu (KR)

(73) Assignee: ESTRA AUTOMOTIVE SYSTEMS CO., LTD., Daegu (KR)

( * ) Notice: Subject to any disclaimer, the term of this patent is extended or adjusted under 35 U.S.C. 154(b) by 206 days.

(21) Appl. No.: 17/920,062

(22) PCT Filed: Apr. 2, 2021

(86) PCT No.: PCT/KR2021/004137
§ 371 (c)(1),
(2) Date: Oct. 20, 2022

(87) PCT Pub. No.: WO2021/215695
PCT Pub. Date: Oct. 28, 2021

(65) Prior Publication Data
US 2023/0158856 A1 May 25, 2023

(30) Foreign Application Priority Data
Apr. 22, 2020 (KR) .................. 10-2020-0048897

(51) Int. Cl.
*B60H 1/32* (2006.01)
*B60H 1/00* (2006.01)

(52) U.S. Cl.
CPC ..... *B60H 1/00328* (2013.01); *B60H 1/00007* (2013.01); *B60H 1/00392* (2013.01); *B60H 1/00485* (2013.01); *B60H 1/3216* (2013.01)

(58) Field of Classification Search
CPC ............ B60H 1/00328; B60H 1/00007; B60H 1/00392; B60H 1/00485; B60H 1/3216
See application file for complete search history.

(56) References Cited

U.S. PATENT DOCUMENTS

| 8,973,387 B2 | 3/2015 | Osaka et al. |
| 2014/0109613 A1 | 4/2014 | Ohno et al. |

FOREIGN PATENT DOCUMENTS

| CN | 107089113 A | 8/2017 |
| JP | 2002-248932 A | 9/2002 |

(Continued)

OTHER PUBLICATIONS

EPO Search Report, dated Apr. 8, 2024, for European Patent Application No. EP 21 79 1836 which corresponds to the above-identified U.S. application.

(Continued)

*Primary Examiner* — Nael N Babaa
(74) *Attorney, Agent, or Firm* — LRK PATENT LAW FIRM

(57) ABSTRACT

A heat pump system for a vehicle includes a compressor; a four-way valve for transferring refrigerant to external or internal heat exchanger; the external heat exchanger for heat-exchanging between the external air and the refrigerant, the internal heat exchanger for heat-exchanging between the refrigerant and the air supplied to the interior of the vehicle, or for heat-exchanging between the refrigerant and the air supplied to the interior of the vehicle; an electric component cooling circuit which absorbs the heat from electric components in the vehicle, to emit same through electric component radiator, or which absorbs heat, and heat-exchanges with refrigerant/electric component coolant heat exchanger for heat-exchanging between the refrigerant and a coolant; a first expansion means for expanding the refrigerant; and a battery chiller which heat-exchanging between a battery and the refrigerant and transferring the refrigerant to the internal heat exchanger.

8 Claims, 9 Drawing Sheets

(56) References Cited

FOREIGN PATENT DOCUMENTS

| | | |
|---|---|---|
| JP | 5755490 B2 | 7/2015 |
| KR | 10-1316355 B1 | 10/2013 |
| KR | 10-2016-0110063 A | 9/2016 |
| KR | 10-2019-0036091 A | 4/2019 |
| KR | 10-2039163 B1 | 11/2019 |
| KR | 10-2183499 B1 | 11/2020 |

OTHER PUBLICATIONS

Search Report, mailed Jun. 25, 2021, for International Application No. PCT/KR2021/004137.
Written Opinion, mailed Jun. 25, 2021, for International Application No. PCT/KR2021/004137.

HEAT PUMP SYSTEM FOR VEHICLE

CROSS-REFERENCE TO RELATED APPLICATIONS

The present application is a U.S. National Phase entry from International Application No. PCT/KR2021/004137, filed on Apr. 2, 2021, which claims priority to Korean Patent Application No. 10-2020-0048897, filed on Apr. 22, 2020, the disclosure of which is incorporated by reference herein in their entirety.

TECHNICAL FIELD

The present disclosure relates to a heat pump system for a vehicle and, in more detail, a heat pump system for a vehicle that easily changes various driving modes using a 4-way valve, an internal heat exchanger, an electric cooling water heater, an electric part cooling circuit, an external heat exchanger, two electronic expansion valves, etc., and has configuration in which only one internal heat exchanger, through which an air conditioning refrigerant flows, is disposed in an HVAC module.

Background Art

An automotive air conditioning system is a system that is generally operated selectively for a cooling function that cools the interior of a vehicle and a heating function that heats the inside of a vehicle. Such an automotive air conditioning system of the related art is configured to cool the interior of a vehicle by taking heat from air, which a flows outside an evaporator of refrigerant cycle, using a refrigerant flowing through the evaporator and to heat the interior of a vehicle by heating air that flows outside a heater core that is disposed in an air conditioning case called an HVAC unit and through which an engine cooling water circulates.

However, in an electric vehicle without an engine, there is no high-temperature engine cooling water that is supposed to be supplied to a heater core, and accordingly, it is required to consider a refrigerant cycle that is operated in a totally different way from automotive air conditioning system in the related art.

As a system that is applied to another type of refrigerant cycle suitable for electric vehicles, a heat pump system that selectively performs heating and cooling functions by changing the flow path of a refrigerant has been recently spotlighted. For example, a system that includes an evaporator and an internal heat exchanger in an HVAC unit, cools interior air by expanding and supplying a refrigerant, which has passed through an external heat exchanger, to the evaporator in a cooling mode, heats interior air by opening an air channel connected to the internal heat exchanger and supplying a high-temperature refrigerant, which has passed through a compressor, to the internal heat exchanger in a heating mode is applied. However, since it is difficult to satisfy the demand for cooling using only a refrigerant cycle, a system including a separate PTC heater mounted in an HVAC unit is representative.

That is, two heat exchangers (an internal heat exchanger and an evaporator installed in an HVAC unit and functioning as heaters) and a PCT heater that are disposed in an HVAC module, and a switch valve that can change the flow direction of a refrigerant are necessary components of the system.

Various types have been proposed for such a heat pump system for a vehicle, and representatively, there is Korean Patent No. 1316355.

An air conditioning system for an electric vehicle that uses the heat pump disclosed in Korean Patent No. 1316355, as shown in FIG. 1, includes: a cooling-heating unit in which an external heat exchanger 11, a first expansion valve 12, an evaporator 13, a compressor 14, an internal heat exchanger 25, and a second expansion valve 53 are connected through a refrigerant channel and a first 3-way valve 51 controlling inflow of a refrigerant into the evaporator 13 is disposed at the upstream side of the first expansion valve 12; and an electric part cooling unit that connects electric parts and an electric part radiator through a cooling channel 35 and circulates cooling water using a water pump. The air conditioning system includes an evaporator 42 disposed in the electric part cooling channel 35, a condenser 41 disposed in the refrigerant channel 16, a loop-type heat pipe 43 connected to the evaporator 42 and the condenser 41 for circulation, and a channel control valve 54 installed in parallel with the second expansion valve 53 and controlling a refrigerant flowing to the second expansion valve 53, in which when the channel control valve 54 is closed and the first 3-way valve 51 forms a channel such that a refrigerant flows through the external heat exchanger 11, the first 3-way valve 51, the compressor 14, the internal heat exchanger 25, and the second expansion valve 53 in the cooling-heating unit, the refrigerant that has passed through the second expansion valve is heated while the refrigerant in the loop-type heat pipe circulates through the evaporator 42 and the condenser 41.

According to the heat pump system having the configuration described above in the related art, when the heating mode is operated, the first 3-way valve 51 is operated such that the refrigerant that has passed through the external heat exchanger 11 flows to the compressor 14 rather than the first expansion valve 12 and the evaporator 13, and a blade 23 that has closed the internal heat exchanger 25 is opened such that air suctioned inside by a blower is heated by the internal heat exchanger 25 and the PTC heater 24. Further, when the cooling mode is operated, the first 3-way valve 51 is operated such that the refrigerant that has passed through the external heat exchanger 11 flows to the first expansion valve 12 and the evaporator 13, and the blade 23 that has closed the internal heat exchanger 25 is closed such that air suctioned inside by a blower is cooled by the evaporator 13.

According to the heat pump system for an electric vehicle in the related art, in the heating mode, the internal heat exchanger 25 installed in the HVAC unit or an air conditioning case 21 performs heating by functioning as a condenser and the external heat exchanger 11 exchanges heat with external air by functioning as an evaporator outside the air conditioning case 21, that is, at the front of a vehicle. In this process, when the external air temperature is low, the internal heat exchanger 25 that functions as a heater is not increased up to an appropriate temperature for heating because the external heat exchanger 11 exchanges heat with cold external air, so heat for heating is not sufficiently supplied. Accordingly, when the external air temperature is low, the heating performance is deteriorated or operation of a heat pump mode system is impossible, so the PTC heater 24 should be unavoidably added in the HVAC unit.

However, there is a need for an effort at the level of generally redesigning the HVAC module to add a separate component, such as a PTC heater, in an HVAC unit that is greatly limited in terms of freedom of design because it is installed in an instrument panel having a narrow package space. In particular, when internal combustion engine vehicles, hybrid vehicles, and electric vehicles of single models are each produced in a large quantity, there is a problem that it is required to develop a new HVAC module for an electric vehicle that is different from the HVAC module developed for an internal combustion engine vehicle.

Accordingly, there is a need for a technology of heat pump system for a vehicle in order to solve the problem in the related art.

PRIOR ART DOCUMENT

Patent Document (Patent Document 1) Korean Patent No. 1316355 (published on 8 Oct. 2013)

DISCLOSURE

Technical Problem

An objective of the present disclosure is to provide a heat pump system that can easily change various driving mode using a 4-way valve, an internal heat exchanger, an electric cooling water heater, an electric part cooling circuit, an external heat exchanger, two expansion valves, etc., and that makes it possible to simplify pipelines and devices for various air conditioning modes so that an HVAC module for an internal combustion engine vehicle including a heater core and an evaporator, which use waste heat from an engine, in the related art can be used as an HVAC module for an electric vehicle that includes a heater core and an internal heat exchanger that are supplied with a cooling water heated by an electric cooling water heater, thereby enabling the HVAC module for an internal combustion engine vehicle in the related art to be used also as an HVAC for an electric vehicle and being able to improve heating efficiency and battery operation performance.

Technical Solution

In order to achieve the objectives, a heat pump system according to an aspect of the present disclosure may include: a compressor configured to compress and discharge a refrigerant; a 4-way valve configured to transmit a refrigerant, which is discharged from the compressor, to an external heat exchanger or an internal heat exchanger, depending on air conditioning modes; the external heat exchanger configured to enable a refrigerant transmitted from the compressor or the internal heat exchanger to exchange heat with air outside a vehicle; the internal heat exchanger configured to enable a refrigerant transmitted from the external heat exchanger to exchange heat with air that is supplied into an HVAC unit or enables a refrigerant discharged from the compressor to exchange heat with air that is supplied into the HVAC unit; an electric part cooling circuit mounted adjacent to the external heat exchanger configured to absorb and discharge heat, which is generated from electric parts mounted in a vehicle, to the outside through the electric part radiator or configured to absorb heat and then perform heat exchange with the refrigerant/electric part cooling water heat exchanger, depending on the air conditioning modes; the refrigerant/electric part cooling water heat exchanger mounted between the external heat exchanger and the 4-way valve and configured to enable heat exchange between a refrigerant that is discharged from the external heat exchanger and cooling water that flows through an electric part cooling water channel; a first expansion device disposed in a refrigerant line going to or coming from the internal heat exchanger to be able to expand a refrigerant, depending on the air conditioning modes; and a battery chiller mounted between the external heat exchanger and the internal heat exchanger in the HVAC module and configured to enable a refrigerant discharged from the external heat exchanger to exchange heat with a battery and then to be transmitted to the internal heat exchanger.

In an embodiment of the present disclosure, the 4-way valve may have: a first port of the 4-way valve configured to function as a refrigerant inlet into which a refrigerant discharged from the compressor always flows regardless of the air conditioning modes; a second port of the 4-way valve that is a refrigerant inlet/outlet that selectively communicates with the first port and a third port, depending on the air conditioning mode, and is connected to the internal heat exchanger disposed in the HVAC unit; a third port of the 4-way valve that is a refrigerant outlet that selectively communicates with the second port and a fourth port, depending on air conditioning modes, and is connected to the compressor in flow of a refrigerant; and a fourth port of the 4-way valve that is a refrigerant inlet/outlet that selectively communicates with the first port and the third port, depending on the air conditioning modes, and is connected to the refrigerant/electric part cooling water heat exchanger.

In an embodiment of the present disclosure, the intermediate heat exchanger may be mounted between the external heat exchanger and the internal heat exchanger, and may transmit a refrigerant discharged from the external heat exchanger to the internal heat exchanger after heat exchange or may transmit a refrigerant discharged from the internal heat exchanger to the external heat exchanger after heat exchange.

In an embodiment of the present disclosure, the heat pump system may further include an accumulator mounted between the intermediate heat exchanger and the compressor and configured to transmit a refrigerant that has passed through the intermediate heat exchanger to the compressor.

In an embodiment of the present disclosure, the internal heat exchanger may include: a first port of the internal heat exchanger through which a refrigerant that has absorbed heat from air that is supplied into a vehicle is discharged or through which a refrigerant for providing heat to air that is supplied into a vehicle flows inside, depending on the air conditioning modes; and a second port of the internal heat exchanger through which a refrigerant that absorbs heat from air that is supplied into a vehicle flows inside or through which a refrigerant that has provided heat to air that is supplied into the vehicle is discharged, depending on the air conditioning modes.

In this case, when the internal heat exchanger is used as an evaporator, depending in the air conditioning modes, a refrigerant that has passed through the first expansion device may flow into the second port of the internal heat exchanger such that a refrigerant transmitted from the external heat exchanger expands through the first expansion device and exchanges heat with air that is supplied into a vehicle.

An Electronic Expansion Valve (EEV) that can control the amount of expansion of a refrigerant or can close a refrigerant channel is applied as the first expansion device.

Further, when the internal heat exchanger is used as a condenser, depending in the air conditioning modes, a refrigerant discharged from the compressor may flow into the first port of the 4-way valve such that the refrigerant discharged from the compressor expands and exchanges heat with air that is supplied into a vehicle.

In an embodiment of the present disclosure, the electric part cooling circuit may include: an electric part radiator mounted adjacent to the external heat exchanger and configured to enable a refrigerant flowing through the electric part cooling water channel to exchange heat with the external heat exchanger; an electric part cooling water channel configured to form the refrigerant/electric part cooling water heat exchanger and the electric part radiator into one cooling water channel, and equipped with an electric part cooler configured to absorb heat generated from electric parts mounted in a vehicle and an electric part cooling water circulation pump configured to generate flow of cooling water in one direction are mounted; an electric part cooling water bypass channel formed on the electric part cooling water channel such that cooling water that has passed through the electric part cooler directly flows to the electric part radiator without passing through the refrigerant/electric part cooling water heat exchanger; and an electric part cooling water 3-way valve mounted at a joint at which the electric part cooling water channel and the electric part cooling water bypass channel communicate with each other, and configured to selectively send cooling water, which has passed through the electric part cooler, to the electric part cooling water bypass channel or the refrigerant/electric part cooling water heat exchanger, depending on the air conditioning modes.

The heat pump system of the present disclosure includes a battery chiller dividing refrigerant line connecting the external heat exchanger and the internal heat exchanger such that a refrigerant discharged from the external heat exchanger flows into a second expansion device to be able to cool a battery by expanding, depending on the air conditioning modes.

In this case, the second expansion device is mounted in a pipeline through which a refrigerant discharged from the external heat exchanger flows into the battery chiller, and a check valve for preventing backflow of a refrigerant is mounted in a pipeline through which a refrigerant is discharged from the battery chiller.

An on/off-type Electronic Expansion Valve (EEV) having a function of opening and closing a channel with a predetermined expansion ratio is applied as the second expansion device.

A battery chiller is configured to be able to cool a battery by expanding a refrigerant by dividing a refrigerant line, which connects the external heat exchanger and the internal heat exchanger, at a side of the external heat exchanger such that a refrigerant discharged from the external heat exchanger flows into the second expansion device, depending on the air conditioning modes. The battery chiller, which is a component mounted in a refrigerant distribution line connecting a second divergent point of the 4-way valve of a refrigerant line, which connects the third port of the 4-way valve and the compressor, and the first divergent point, can transmit a refrigerant discharged from the external heat exchanger 130 to the internal heat exchanger 140 after heat exchange, depending on the air conditioning modes. The second divergent point is positioned before the intermediate heat exchanger to further increase the degree of super heat and performance of the refrigerant coming out of the battery chiller.

In an embodiment of the present disclosure, the heat pump system may further include a heater core that is mounted in an air flow pipeline for supplying air into a vehicle and is supplied with cooling water heated by an electric cooling water heater to be able to apply heat to air that is supplied into the vehicle when the air conditioning mode is a heating mode, a dehumidifying mode, or a defrosting mode.

Advantageous Effects

As described above, since there are provided a 4-way valve, a compressor, an external heat exchanger, and an internal heat exchanger that perform specific functions, respectively, it is possible to provide a heat pump system that can easily change a cooling mode and a heating mode, simplify pipelines and devices for the cooling mode and the heating mode, and improve heating efficiency and battery operation performance. Further, it is possible to share an HVAC module for internal combustion engine vehicle and an HVAC module for electric vehicles.

BEST MODE FOR DISCLOSURE

Hereafter, a "heat pump for a vehicle" of the present disclosure is described in detail with reference to the accompanying drawings. The embodiments to be described are provided for those skilled in the art to easily understand the spirit of the present disclosure and the present disclosure is not limited thereto. The configurations shown in the accompanying drawings are provided to easily describe embodiments of the present disclosure and may be different from actual configurations.

Expression "including components", which is "open" expression, simply means that there are the components and should not be construed as excluding additional components.

It is to be understood that when one element is referred to as being "connected to" or "coupled to" another element, it may be connected directly to or coupled directly to another element or be connected to or coupled to another element, having the other element intervening therebetween.

Expression "first", "second", etc. is used only to discriminate a plurality of components without limiting the orders of components or other features. In particular, expressions such as "first expansion device" and "second expansion device", or "first port", "second port", "third port", and "fourth port" are provided only to clearly discriminate components without limiting the orders of components or other features.

General configuration of a heat pump system for a vehicle of the present disclosure is described with reference to FIG. 2.

Figure 1:
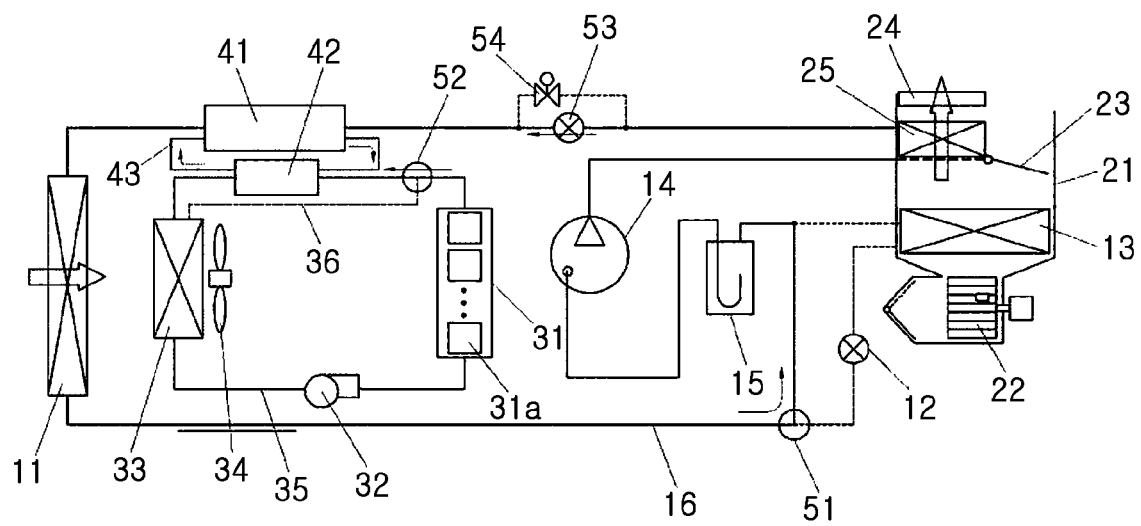
FIG. 1 is a configuration diagram showing a heat pump system for a vehicle according to the related art.
Figure 2:
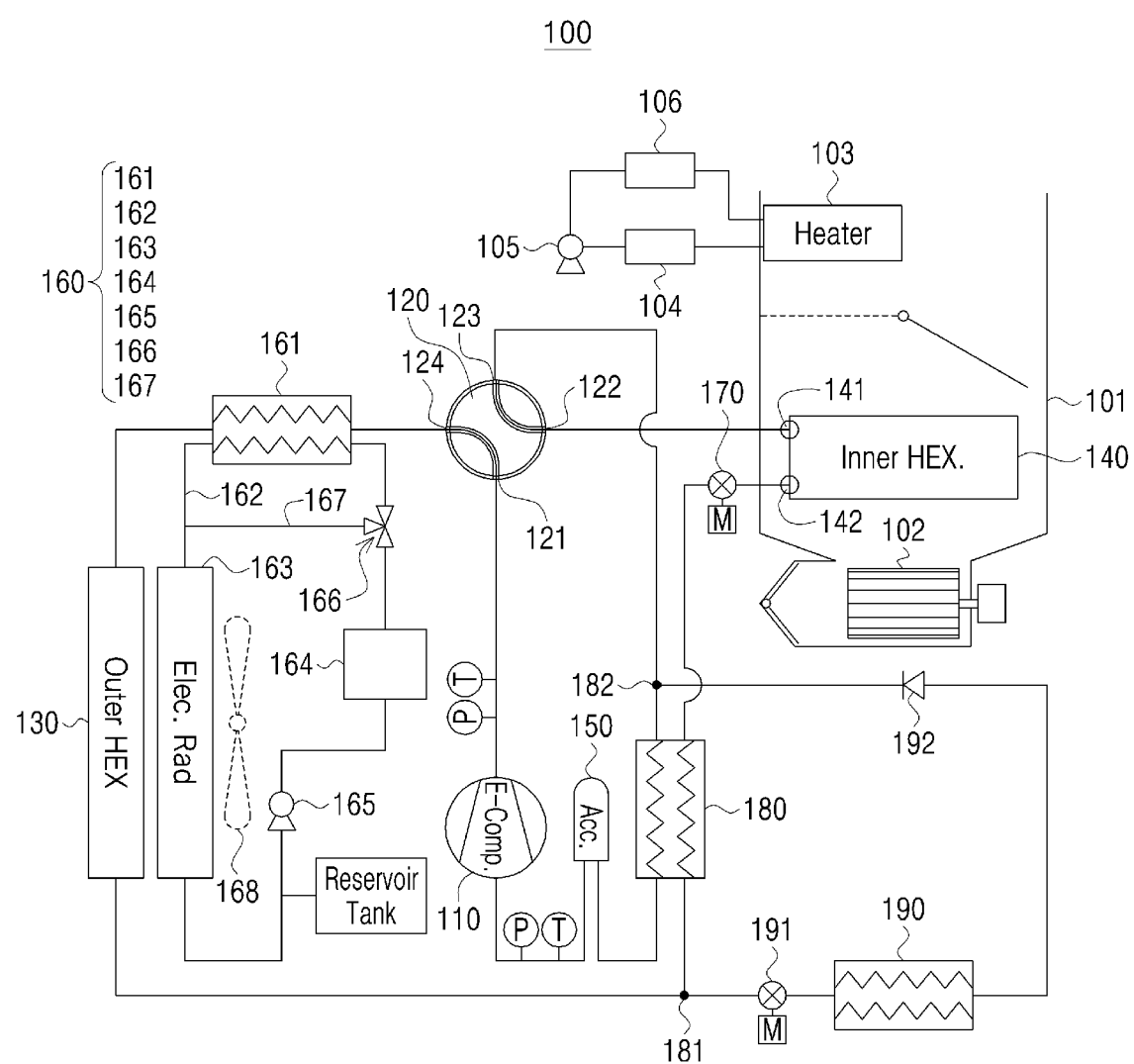
FIG. 2 is a configuration diagram showing a heat pump system for a vehicle according to an embodiment of the present disclosure.

FIG. 2 shows the configuration of a heat pump system according to an embodiment of the present disclosure.

First, the configuration of a heat pump system for a vehicle according to an embodiment of the present disclosure is as follows.

A heat pump system 100 for a vehicle according to an embodiment of the present disclosure may include a compressor 110, a 4-way valve 120, an external heat exchanger 130, an internal heat exchanger 140, an electric part cooling circuit 160, a first expansion device 170, and a battery chiller 190 that are disposed at specific positions and perform specific functions.

In more detail, the compressor 110 is a component that compresses and then discharges a refrigerant and the 4-way valve 120 is a component that transmits a refrigerant, which is discharged from the compressor 110, to the external heat exchanger 130 or the internal heat exchanger 140, depending on air conditioning modes.

The external heat exchanger 130 is a component that enables a refrigerant transmitted from the compressor 110 or the internal heat exchanger 140 to exchange heat with air outside a vehicle. The internal heat exchanger 140 is a component that enables a refrigerant transmitted from the external heat exchanger 130 to exchange heat with air that is supplied into a vehicle or enables a refrigerant discharged from the compressor 110 to exchange heat with air that is supplied into a vehicle. The first expansion device 170 is a component that is disposed in a refrigerant line going to or coming from the internal heat exchanger 140 to be able to expand a refrigerant, depending on air conditioning modes.

The electric part cooling circuit 160 is a component that is mounted adjacent to the external heat exchanger 130 and that absorbs and discharges heat, which is generated from electric parts mounted in a vehicle, to the outside, depending on air conditioning modes.

As a part of the electric part cooling circuit 160, a refrigerant/electric part cooling water heat exchanger 161 mounted between the external heat exchanger 130 and the 4-way valve 120 heat exchange between a and enabling refrigerant that is discharged from the external heat exchanger 130 and cooling water that flows through an electric part cooling water channel 162 is included.

Next, the 4-way valve 120 according to the present disclosure is a component including a first port 121, a second port 122, a third port 123, and a fourth port 124 that guide flow of a refrigerant into specific directions.

The first port 121 of the 4-way valve 120 is a refrigerant inlet into which a refrigerant discharged from the compressor 120 always flows regardless of air conditioning modes.

The second port 122 of the 4-way valve 120 is a refrigerant inlet/outlet that selectively communicates with the first port and the third port, depending on air conditioning mode, and is connected to the internal heat exchanger 140 disposed in an HVAC unit.

The third port 123 the of 4-way valve is a refrigerant outlet that selectively communicates with the second port and the fourth port, depending on air conditioning modes, and is connected to an intermediate heat exchanger disposed at the upstream side of the compressor in flow of a refrigerant.

The fourth port 122 of the 4-way valve is a refrigerant inlet/outlet that selectively communicates with the first port and the third port, depending on air conditioning modes, and is connected to a refrigerant/electric part cooling water heat exchanger of the electric part cooling circuit.

According to the ports of the 4-way valves, the third port and the fourth port communicate with each other when the first port and the second port communicate with each other, and the second port and the third port communicate with each other when the first port and the fourth port communicate with each other.

Accordingly, a refrigerant discharged from the compressor is transmitted to the refrigerant/electric part cooling water heat exchanger 161 of the electric part cooling circuit 160 when the first port communicates with the fourth port in the 4-way valve; and a refrigerant that has passed through the refrigerant/electric part cooling water heat exchanger 161 of the electric part cooling circuit is transmitted to the intermediate heat exchanger 180 disposed at the upstream side of the compressor in flow of a refrigerant when the fourth port communicates with and the third port.

There are provided a first divergent point 181 at which refrigerants separate or join each other at the side of the external heat exchanger 130 in the refrigerant line connecting the external heat exchanger 130 and the internal heat exchanger 140 without the 4-way valve 120 and a second divergent point 182 at which refrigerants separate or join each other at the side of the 4-way valve 120 in the refrigerant line 120 connecting the third port 123 of the 4-way valve 120 and the compressor 110, and a battery chiller 190 is mounted in a separate refrigerant line connecting the first divergent point 181 and the second divergent point 182, whereby the refrigerant discharged from the external heat exchanger 130 is sent into the second expansion device 191, depending on air conditioning mode. Further, a check valve 192 for preventing backflow of a refrigerant is disposed in a pipeline through which a refrigerant is discharged from the battery chiller 190.

The second divergent point 182 is positioned before an intermediate heat exchanger 180 to further increase the degree of super heat and performance of the refrigerant coming out of the battery chiller.

The intermediate heat exchanger 180, which is a component that is additionally disposed between the first divergent point 182 and the internal heat exchanger 140 in the refrigerant line connecting the external heat exchanger 130 and the internal heat exchanger 140, can transmit a refrigerant discharged from the external heat exchanger 130 to the internal heat exchanger 140 after heat exchange or can transmit a refrigerant discharged from the internal heat exchanger 140 to the external heat exchanger 130 after heat exchange.

The intermediate heat exchanger 180 according to an embodiment of the present disclosure, which is also referred to as an IHX in abbreviation, is provided for heat exchange between refrigerants that have passed and have not passed yet through the first expansion device 170 and the internal heat exchanger 140, respectively. Depending on embodiments, the intermediate heat exchanger 180 may be a double-pipe shape heat exchanger including an outer pipeline for transmitting a refrigerant to the first expansion device 170 and an inner pipeline for transmitting a refrigerant to an accumulator 150 and the compressor 110. A refrigerant having relatively high pressure and temperature flows through the outer pipeline connected to the first expansion device 170 and a refrigerant having relatively low pressure and temperature flows through the inner pipeline.

A heater core 103 that is supplied with cooling water heated by an electric cooling water heater 104 is mounted at the position of a heater core, which obtains heat from waste heat of an engine, of an HVAC module for an internal combustion engine vehicle in the related art. The heater core 103 is disposed in a channel for supplying air into a vehicle and is controlled to apply heat to air that is supplied into a vehicle in a heating mode, a dehumidifying mode, or a defrosting mode, the electric part cooling circuit 160 is controlled to operate when the air conditioning mode of the heat pump system is a heating mode or a cooling mode, and the refrigerant/electric part cooling water heat exchanger 161 is operated as a water cooling type condenser using electric part cooling water in the cooling mode and as an evaporator absorbing heat from electric parts in the heating mode.

According to an embodiment of the present disclosure, in an HVAC module for an internal combustion engine vehicle including a heater core to which engine cooling water is supplied in the related art, a heater core 103 that is supplied with a cooling water heated by the electric cooling water heater 104 can be directly installed at the position of the heater core, so it is possible too share an HVAC module for an internal combustion engine vehicle and an HVAC module for an electric vehicle and it is also possible to share the heater core.

Air conditioning modes of the heat pump system for a vehicle are described in detail hereafter.

FIGS. 3 to 7 are refrigerant circulation diagrams showing refrigerant circulation in a cooling mode, a heating mode, a dehumidifying mode, and a defrosting mode of the heat pump system according to an embodiment of the present disclosure.

Figure 3:
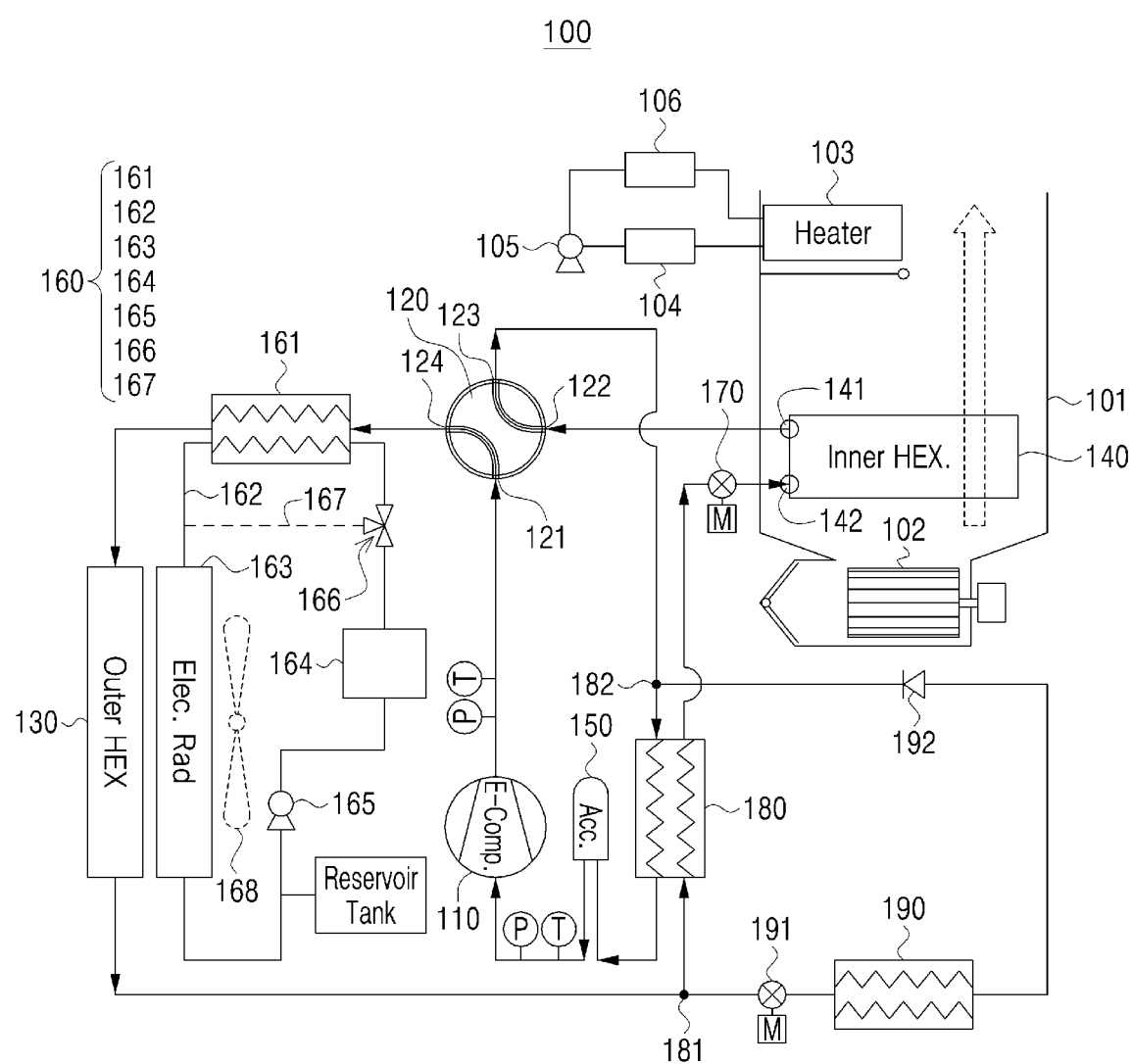
FIG. 3 is a schematic diagram showing flow of a refrigerant in a cooling mode of the heat pump system according to an embodiment of the present disclosure.

First, a cooling mode shown in FIG. 3 is described.

In a cooling mode, a refrigerant is controlled to flow in order of "compressor 110—4-way valve 120—electric part cooling circuit 160 (the refrigerant/electric part cooling water heat exchanger 161 functioning as a water cooling type condenser)—external heat exchanger 130 (functioning as a condenser)—intermediate heat exchanger 180—internal heat exchanger 140 (functioning as an evaporator)—4-way valve 120—accumulator 150—compressor 110".

In the cooling mode, the first port 121 communicates with the fourth port 124 and the second port 122 communicates with the third port 123 in the 4-way valve 120 such that the refrigerant discharged from the compressor 110 flows into the external heat exchanger 130 and the refrigerant discharged from the internal heat exchanger 140 flows into the compressor 110.

The internal heat exchanger 140 according to the present disclosure is a component that enables a refrigerant transmitted from the external heat exchanger 130 to exchange heat with air that is supplied into a vehicle or enables a refrigerant discharged from the compressor 110 to exchange heat with air that is supplied into a vehicle, depending on air conditioning modes. To this end, the internal heat exchanger 140 according to the present disclosure has a first port 141 and a second port 142 of which the functions depend on air conditioning modes. In detail, the first port 141 of the internal heat exchanger is a part through which a refrigerant that has absorbed heat from air flowing in the HVAC unit is discharged or through which a refrigerant for providing heat to air that is supplied into a vehicle flows inside, depending on air conditioning modes. The second port 142 is a part through which a refrigerant that absorbs heat from air flowing in the HVAC unit flows inside or through which a refrigerant that has provided heat to air that is supplied into a vehicle is discharged.

As described above, the internal heat exchanger 140 functions as an evaporator when the air conditioning mode is a cooling mode, in which a refrigerant that has passed through expansion device 170 flows into the second port 142 of the internal heat exchanger 140 such that a refrigerant transmitted from the external heat exchanger 130 expands through the first expansion device 170 and exchanges heat with air that is supplied into a vehicle.

The accumulator 150, which is a component mounted between the intermediate heat exchanger 180 and the compressor 110, absorbs a refrigerant, which is discharged from the internal heat exchanger 140, through the 4-way valve 120 and then transmits the refrigerant to the compressor 110.

The electric part cooling circuit 160 can be operated when the air conditioning mode is a cooling mode, and in this case, the refrigerant/electric part cooling water heat exchanger 161 operates as a water cooling type condenser using electric part cooling water, thereby being able to further cool a refrigerant in the refrigerant/electric part cooling water heat exchanger 161. Accordingly, it is possible to improve cooling performance.

The cooling mode shown in FIG. 3 is an operation mode under an external air temperature condition that does not require battery cooling and the second expansion device is closed to prevent a refrigerant channel from which the refrigerant line connecting the external heat exchanger 130 and the intermediate heat exchanger diverges from opening and to prevent a refrigerant from flowing to the battery chiller 190. The case in which the cooling mode and battery cooling are simultaneously performed is described separately with reference to FIG. 8.

The cooling mode shown in FIG. 3 is, as described above, an external air temperature condition that does not require battery cooling and shows an embodiment in which the temperature of electric part cooling water is a setting temperature (70~80 degrees) or less, and in this situation, since the temperature of electric part cooling water is lower than the setting temperature, cooling of electric parts is not influenced even though heat transfers from a refrigerant and electric part cooling water flows to the refrigerant/electric part cooling water heat exchanger 161 through a cooling water circulation pump 165, an electric part cooler 164, and an electric part cooling 3-way valve 166.

Figure 4:
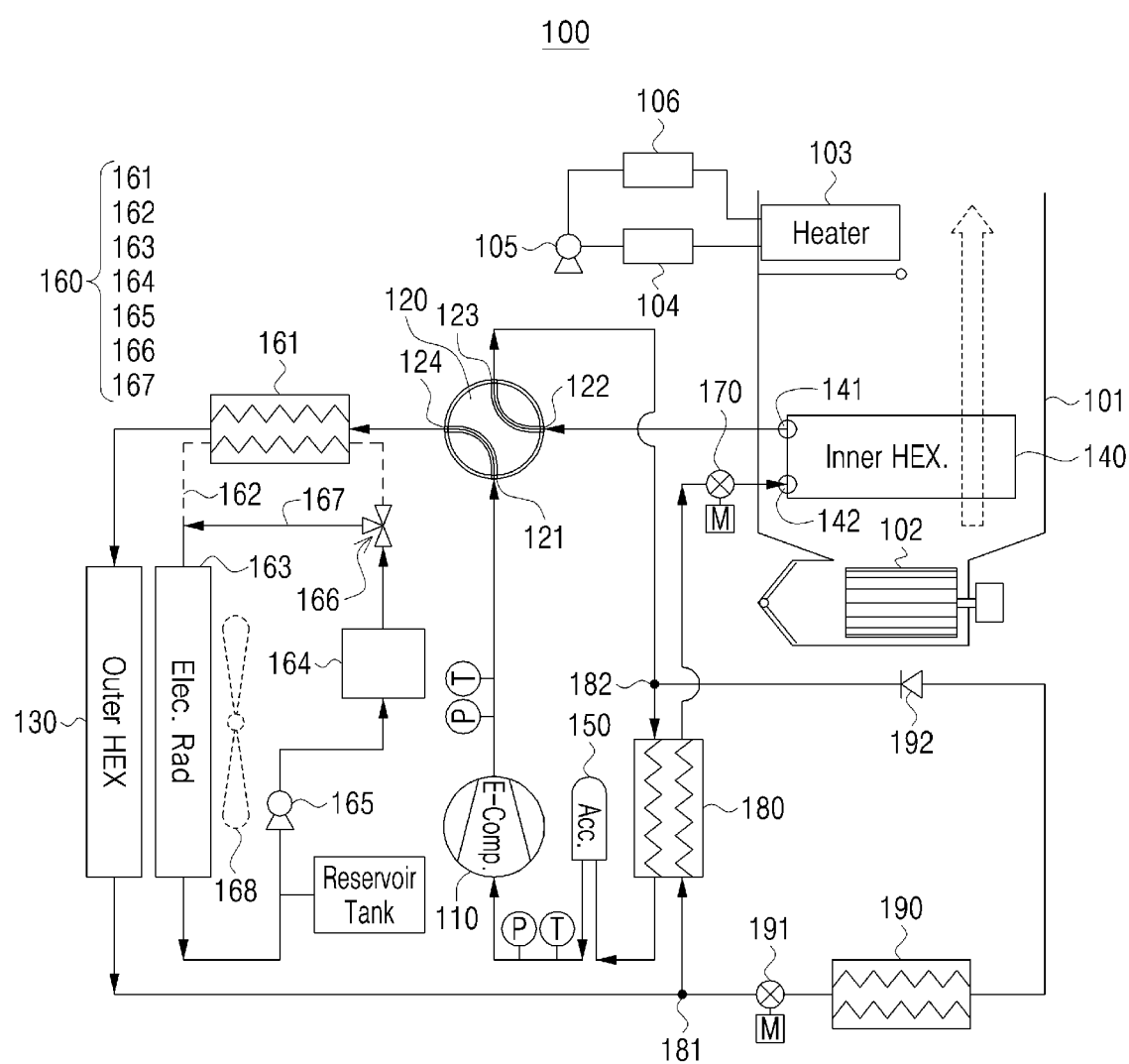
FIG. 4 is a schematic view showing the state in which flow of cooling water has been partially changed using a waste heat collector in the cooling mode of the heat pump system according to an embodiment of the present disclosure.

Meanwhile, as shown in FIG. 4, it is possible to absorb and discharge heat, which is generated from electric parts mounted in a vehicle, to only an electric part radiator 163 using the electric part cooling circuit 160.

The electric part cooling circuit 160 includes a refrigerant/electric part cooling water heat exchanger 161, an electric part radiator 163, an electric part cooling water channel 162, an electric part cooling water bypass channel 167, and an electric part cooling water 3-way valve 166.

In detail, the electric part radiator 163, which is a component mounted adjacent to the external heat exchanger 130, discharges heat of cooling water that flows through the electric part cooling water channel 162. In this configuration, it may be possible to promote heat dissipation by installing a separate cooling fan 168, as shown in the figure. The electric part cooling water channel 162 forms the refrigerant/electric part cooling water heat exchanger 161 and the electric part radiator 163 into one cooling water channel, and the electric part cooler 164 that absorbs heat generated from electric parts mounted in a vehicle and the electric part cooling water circulation pump 165 that generates flow of cooling water in one direction are mounted in the electric part cooling water channel 162.

The electric part cooling water bypass channel 167, as shown in FIG. 4, is formed on the electric part cooling water channel 162 such that cooling water that has passed through the electric part cooler 164 directly flows to the electric part radiator 163 without passing through the refrigerant/electric part cooling water heat exchanger 161. The electric part cooling water 3-way valve 166 mounted at the joint at which the electric part cooling water channel 162 and the electric part cooling water bypass channel 167 communicate with each other selectively sends cooling water, which has passed through the electric part cooler 164, to the electric part cooling water bypass channel 167 or the refrigerant/electric part cooling water heat exchanger 161, depending on air conditioning modes.

The case shown in FIG. 4 shows that when the air conditioning mode is a cooling mode, the temperature of electric part cooling water is a setting temperature (70~80 degrees) or more, and electric part cooling water is sent to the refrigerant/electric part cooling water heat exchanger 161 that operates as a water cooling type condenser, the cooling water additionally receives heat from a refrigerant, so cooling of electric part is no longer expected, and accordingly, cooling water that has passed through the electric part cooler 164 is directly to the electric part radiator 163 through the electric part cooling water bypass channel 167 by operating the electric part cooling water 3-way valve 166

That is, the temperature value of the cooling water that has passed through the electric part cooler 164 is a setting temperature value or more, the electric part cooling water 3-way valve 166 guides flow of electric part cooling water to the electric part cooling water bypass channel 167 so that the cooling water that has passed through the electric part cooler 164 flows directly to the electric part radiator 163 without passing through the refrigerant/electric part cooling water heat exchanger 161. The temperature value of the cooling water may be set as 70~80 degrees.

Meanwhile, cooling water that passes through the electric part cooling water channel 162 and the electric part cooling water bypass channel 167 may be cooling water to which an antifreeze solution is added unlike the refrigerant that is used in a refrigeration cycle.

Next, the heating mode of the present disclosure is described with reference to FIG. 5.

In the heating mode, a refrigerant is controlled to flow in order of "compressor 110—4-way valve 120—internal heat exchanger 140 (functioning as a condenser)—external heat exchanger 130 (functioning as an evaporator) electric part cooling circuit 160 (the refrigerant/electric part cooling water heat exchanger 161 functioning as a water cooling type condenser)—4-way valve 120—accumulator 150—compressor 110".

The first port 121 communicates with the second port 122 and the third port 122 communicates with the fourth port 123 in the 4-way valve 120 such that the refrigerant discharged from the compressor 110 flows into the internal heat exchanger 140 and the refrigerant discharged from the external heat exchanger 130 flows into the compressor 110.

As described above, when the air conditioning mode is the heating mode, the internal heat exchanger 140 functions as a condenser, and the refrigerant discharged from the compressor 110 flows into the first port 141 of the internal heat exchanger 140 such that the refrigerant discharged from the compressor 110 is condensed and exchanges heat with air that is supplied into a vehicle.

It is also possible to improve heating performance by operating the electric cooling water heater 104 so that heat can be applied to air that is supplied into a vehicle. As shown in the figures, a heater core is disposed in the HVAC unit, a cooling water line for circulation through the heater core is configured, and an electric cooling water heater 104, a pump 105, and a cooling water reservoir tank 106 are disposed in the cooling water line.

The accumulator 150 can absorb a refrigerant, which is discharged from the electric part cooling circuit 160, through the 4-way valve 120 and then transmit the refrigerant to the compressor 110. In the electric part cooling circuit 160, the refrigerant discharged from the external heat exchanger 130 can absorb heat, which is generated by electric parts mounted in a vehicle, through heat exchange and the refrigerant that has absorbed heat can be transmitted to the accumulator 150 through the 4-way valve 120.

The case in which the heating mode is operated, as described above, corresponds to wintertime, and in general, it is not required to cool a battery in this case, so the second expansion device 191 is closed to prevent a refrigerant from flowing to the battery chiller 190. When it is required to cool a battery due to problems with the battery itself or the surroundings, a battery cooling mode to be described below in which only battery cooling is performed is entered, whereby battery cooling is performed and heating is performed by the electric cooling water heater.

Figure 5:
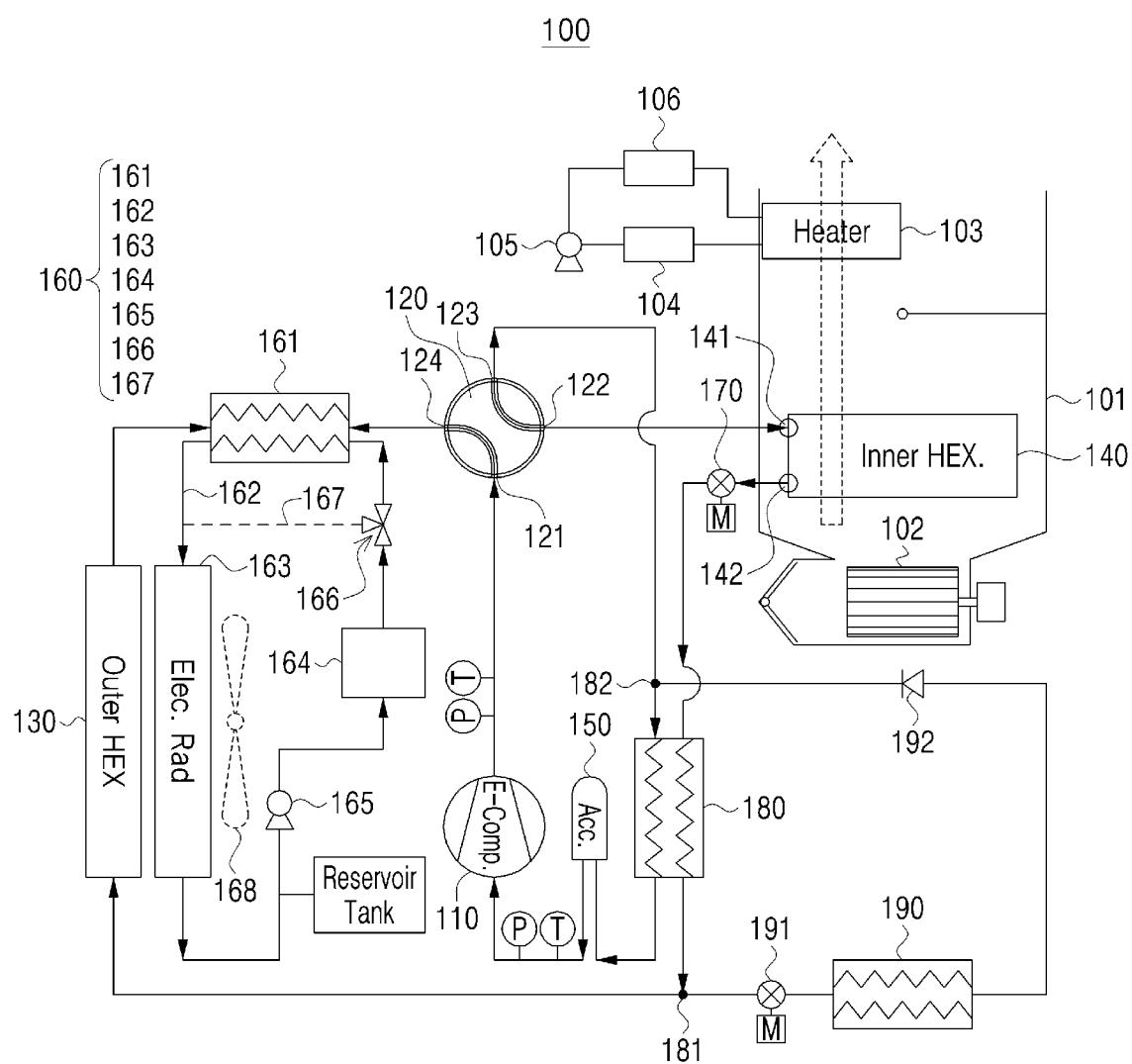
FIG. 5 is a schematic view showing flow of a refrigerant in a heating mode of the heat pump system according to an embodiment of the present disclosure.

In the heating mode, the electric part cooling circuit 160, as shown in FIG. 5, includes the refrigerant/electric part cooling water heat exchanger 161 mounted between the external heat exchanger 130 and the 4-way valve 120, the electric part radiator 163 mounted adjacent to the external heat exchanger 130, and the electric part cooling water channel 162.

The refrigerant/electric part cooling water heat exchanger 161 can enable a refrigerant discharged from the external heat exchanger 130 and electric part cooling water flowing through the electric part cooling water channel 162 to exchange heat with each other. The electric part cooling water channel 162 forms one refrigerant line connecting the refrigerant/electric part cooling water heat exchanger 161 and the electric part radiator 163, and the electric part cooler 164 that absorbs heat generated from electric parts mounted in a vehicle and the electric part cooling water circulation pump 165 that generates flow of a refrigerant in one direction are mounted in the electric part cooling water channel 162.

In this configuration, the electric part cooling water 3-way valve 166 guides cooling water, which has passed through the electric part cooler 164, to the refrigerant/electric part cooling water heat exchanger 161 and simultaneously prevents cooling water, which has passed through the electric part cooler 164, from flowing to the electric part cooling water bypass channel 167.

Depending on case, the electric part cooling water 3-way valve 166 may guide electric part cooling water to the electric part cooling water bypass channel 167 such that the cooling water, which has passed through the electric part cooler 164, directly flows to the electric part radiator 163 without passing through the refrigerant/electric part cooling water heat exchanger 161. The reason is that it is possible to expect that the refrigerant/electric part cooling water heat exchanger 161 functions as an evaporator because there is no heat from electric parts when the temperature of electric part cooling water is very low such as when a vehicle that has been parked outside for a long time is started.

However, when a vehicle is being driven, heat is generated from electric parts, and the refrigerant/electric part cooling water heat exchanger 161 of the electric part cooling circuit 160 functions as an evaporator when a refrigerant flows into the electric part cooling circuit 160, whereby a refrigerant reaches a relatively high temperature by absorbing heat from the electric parts and flows into the accumulator 150 and the compressor. Accordingly, the amount of heat that is generated from the internal heat exchanger 140 increases and heating performance is further improved.

Figure 6:
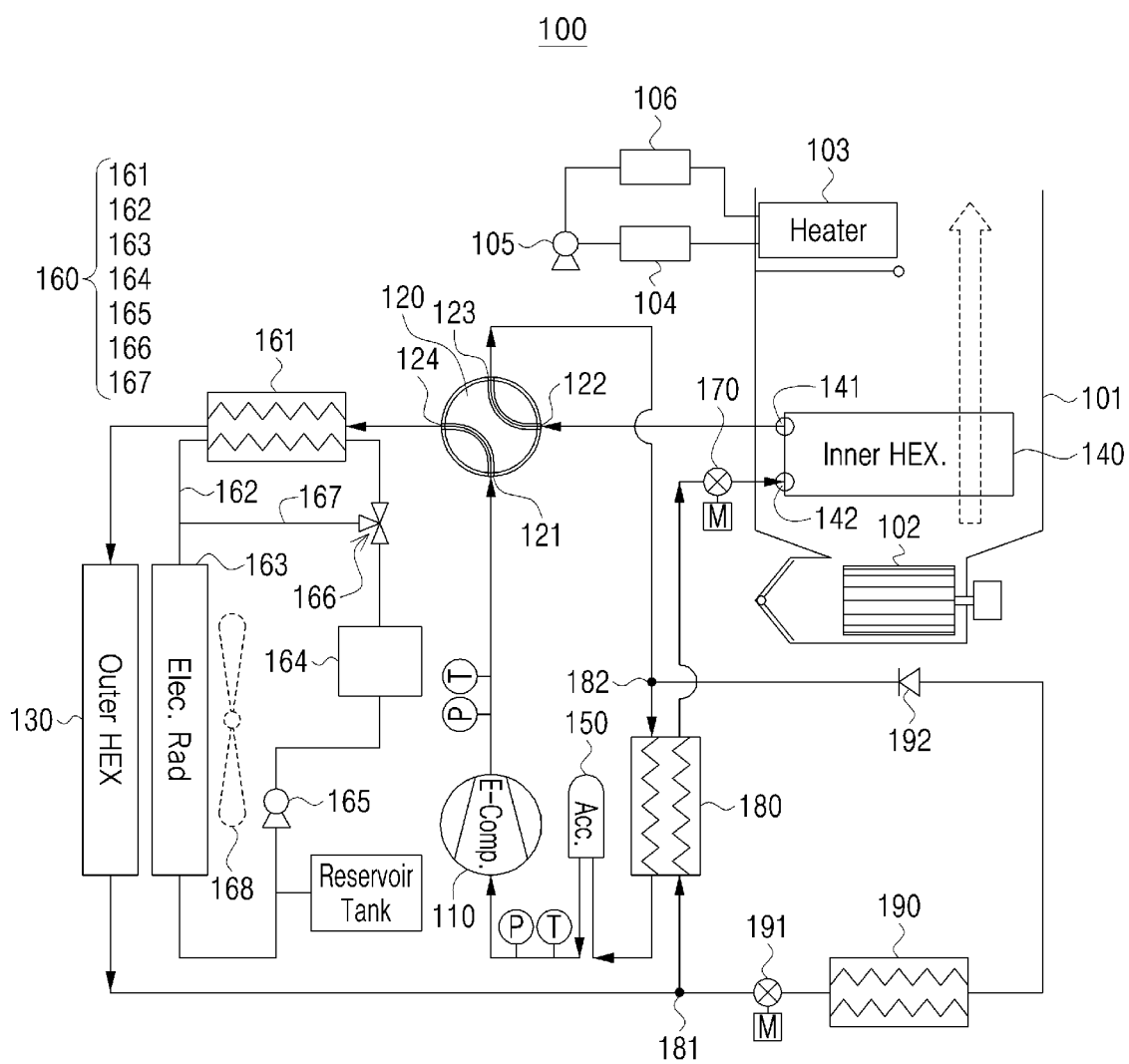
FIG. 6 is a schematic view showing flow of a refrigerant in a dehumidifying mode of the heat pump system according to an embodiment of the present disclosure.

Next, the dehumidifying mode of the present disclosure is described with reference to FIG. 6.

In the dehumidifying mode, a refrigerant is controlled to flow in order of "compressor 110—4-way valve 120—electric part cooling circuit 160 (the refrigerant/electric part cooling water heat exchanger 161 functioning as a water cooling type condenser)—external heat exchanger 130 (functioning as a condenser)—intermediate heat exchanger 180—internal heat exchanger 140 (functioning as an evaporator)—4-way valve 120—accumulator 150—compressor 110".

In this case, the ports of the 4-way valves communicate with each other in the same way as the cooling mode such that the refrigerant discharged from the compressor 110 flows into the external heat exchanger 130 through the electric part cooling circuit 160 and the refrigerant discharged from the internal heat exchanger 140 flows into the compressor 110 through the intermediate heat exchanger 180.

The electric cooling water heater 104 is also operated to apply heat to air that is supplied into a vehicle.

As in this embodiment, when the air conditioning mode is the dehumidifying mode, the internal heat exchanger 140 functions as an evaporator and air flowing in the HVAC unit condenses on the surface of the internal heat exchanger 140 functioning as an evaporator, whereby moisture in the air is removed.

The refrigerant that has passed through the first expansion device 170 is controlled to flow into the second port 142 of the internal heat exchanger 140 such that the refrigerant transmitted from the external heat exchanger 130 expands through the first expansion device 170 and exchanges heat with air that is supplied into a vehicle.

The electric cooling water heater 104 described above, which is a component that supplies heated cooling water to the heater core 103 mounted in an air flow path in the HVAC unit to supply air into a vehicle, can apply heat to air that is supplied into a vehicle, if necessary, whereby it is possible to provide air at an appropriate temperature to a driver who wants only a dehumidifying function rather than a cooling function.

Further, the case in which the dehumidifying mode is operated may correspond to summertime, so the temperature of a battery may increase and battery efficiency may decrease. Accordingly, the refrigerant line connecting the external heat exchanger 130, the intermediate heat exchanger 180 to each other is divided such that a refrigerant expands through the second expansion device 191 and the battery chiller 190 functions as an evaporator while the expanding refrigerant passes through the battery chiller 190, thereby cooling the battery.

When the dehumidifying mode is operated but it is not required to cool a battery, the second expansion device is closed to prevent a refrigerant from passing through the battery.

The defrosting mode of the present disclosure is described with reference to FIG. 7.

In the defrosting mode, a refrigerant is controlled to flow in order of "compressor 110—4-way valve 120—electric part cooling circuit 160 (the refrigerant/electric part cooling water heat exchanger 161 functioning as a water cooling type condenser)—external heat exchanger 130 (functioning as a condenser)—intermediate heat exchanger 180—internal heat exchanger 140 (functioning as an evaporator)—4-way valve 120—accumulator 150—compressor 110".

In the defrosting mode, the ports of the 4-way valve 120 communicate with each other in the same way as the cooling mode such that the refrigerant discharged from the compressor 110 flows into the external heat exchanger 130 and the refrigerant discharged from the internal heat exchanger 140 flows into the compressor 110.

The electric cooling water heater 104 is also operated to apply heat to air that is supplied into a vehicle.

When the air conditioning mode is the defrosting mode, as in this embodiment, the internal heat exchanger 140 functions as an evaporator and the external heat exchanger 130 functions as a condenser. That is, heat of interior air is absorbed through an evaporator and the heat is discharged through the external heat exchanger 130 in the HVAC unit, whereby it is possible to remove frost formed on the surface of the external heat exchanger 130 due to a continuous heating mode in wintertime.

In the defrosting mode, the refrigerant that has passed through the first expansion device 170 is controlled to flow into the second port 142 of the internal heat exchanger 140 such that the refrigerant transmitted from the external heat exchanger 130 can decrease in temperature by expanding through the first expansion device 170 and can decrease the temperature of air flowing in the HVAC unit by absorbing heat from the air.

The electric cooling water heater 104 described above, which is a component for supplying heated cooling water to the heater core 103 mounted in the HVAC, applies heat to air that is supplied into a vehicle, so it is possible to obtain air having an increased temperature by increasing the temperature of the air of which the temperature has decreased through the internal heat exchanger in the defrosting mode that is operated in wintertime.

The case in which the defrosting mode is operated corresponds to wintertime for which the outdoor temperature is low, and in this case, in general, it is not required to cool a battery, so the second expansion device 191 is closed to prevent a refrigerant from flowing.

When frost on the external heat exchanger 130 is sensed and the defrosting mode is operated, it is possible to stop operation of the cooling fan 168 and the electric part cooling water circulation pump 165 in order to increase the temperature of the refrigerant that is supplied to the external heat exchanger 130, and it is possible to operate an internal/external air mode into an internal air mode or a partial external air (external air of 10~20%) state and circulate cooling water heated by the electric cooling water heater 104 into the HVAC module for the heating function.

Figure 8:
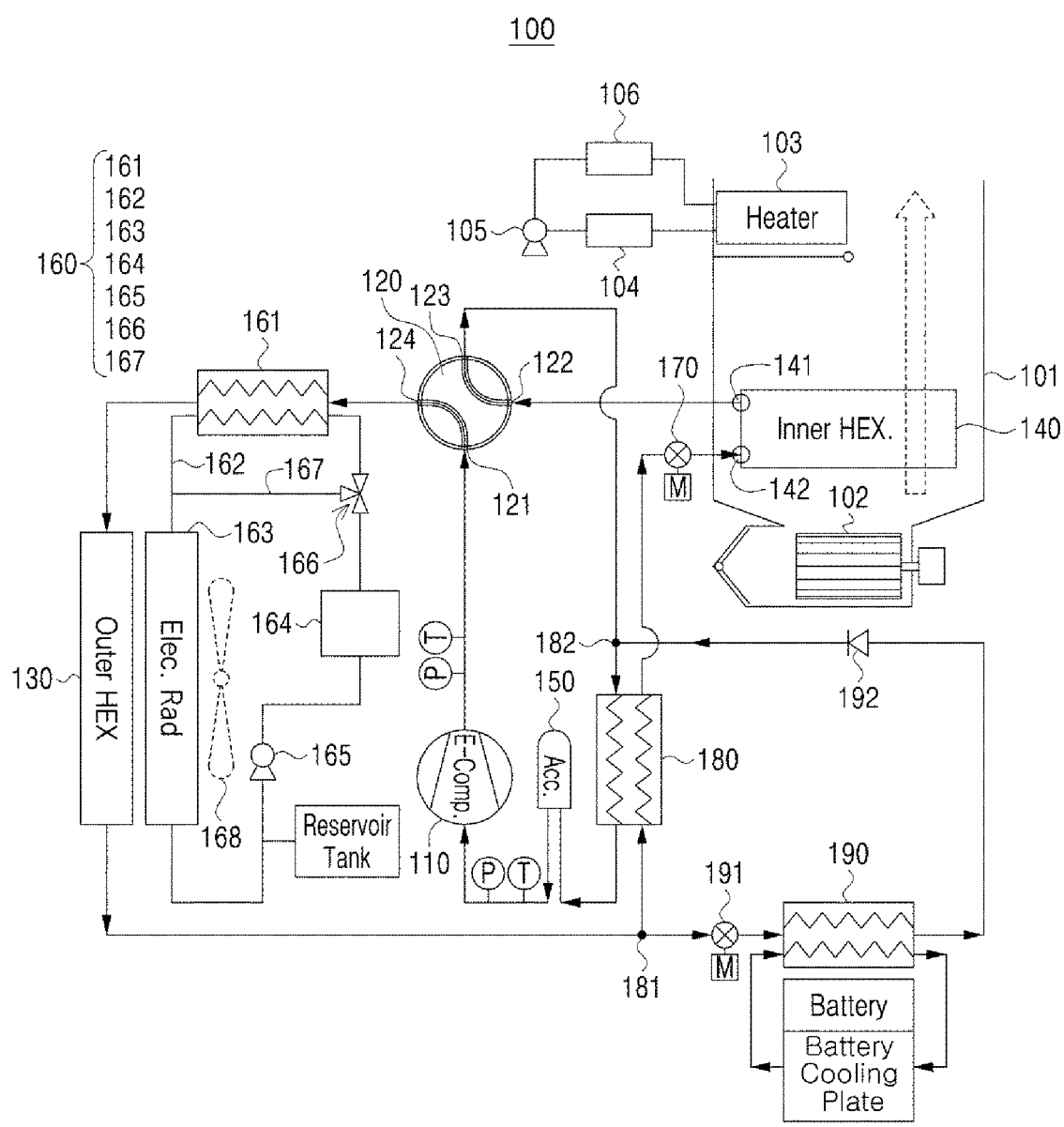
FIG. 8 is a schematic view showing flow of a refrigerant in the cooling mode and battery cooling of the heat pump system according to an embodiment of the present disclosure.
Figure 9:
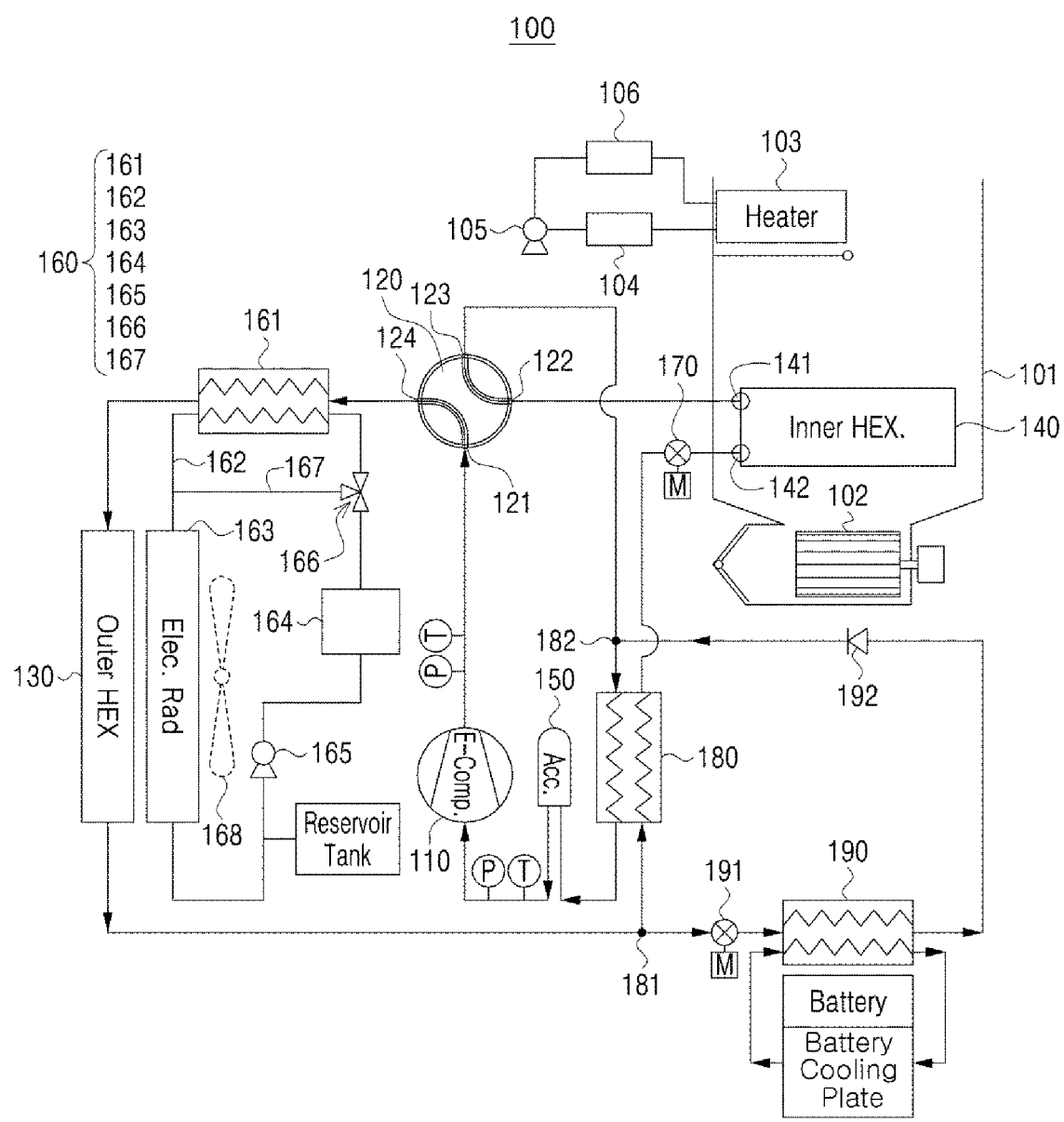
FIG. 9 is a schematic diagram showing flow of a refrigerant only in battery cooling by fully closing a first expansion device and opening a second expansion device in the heat pump system according to an embodiment of the present disclosure.

Next, the case in which the cooling mode and the battery cooling mode of the present disclosure are simultaneously performed is described with reference to FIG. 8.

When the cooling mode and the battery cooling mode of the present disclosure are simultaneously performed, a refrigerant is controlled to flow in order of "compressor 110—4-way valve 120—electric part cooling circuit 160 (the refrigerant/electric part cooling water heat exchanger 161 functioning as a water cooling type condenser)—external heat exchanger 130 (functioning as a condenser)—intermediate heat exchanger 180—internal heat exchanger 140 (functioning as an evaporator)—4-way valve 120—accumulator 150—compressor 110". Further, some of the refrigerant distributed from the refrigerant line connecting the external heat exchanger 130 and the intermediate heat exchanger 180 to each other flows into the battery chiller 190 through the second expansion device 191 to cool a battery.

When the air conditioning mode is the cooling mode, the internal heat exchanger 140 functions as an evaporator. The refrigerant that has passed through the first expansion device 170 flows into the second port 142 of the internal heat exchanger 140 such that the refrigerant transmitted from the external heat exchanger 130 expands through the first expansion device 170 and exchanges heat with air that is supplied into a vehicle. The accumulator 150, which is a component mounted between the intermediate heat exchanger 180 and the compressor 110, receives a refrigerant, which is discharged from the internal heat exchanger 140, through the 4-way valve 120 and then transmits the refrigerant to the compressor 110.

Figure 7:
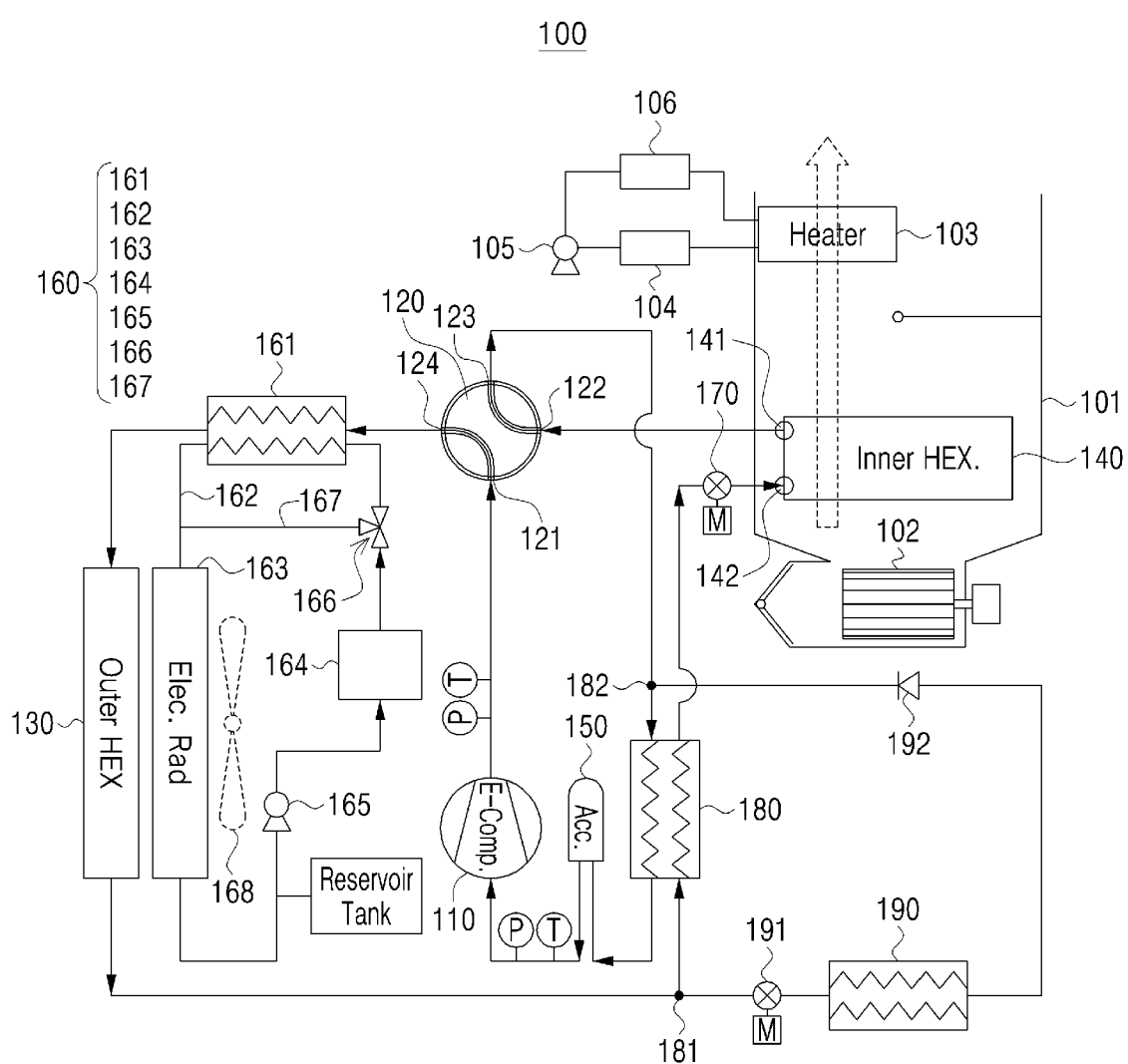
FIG. 7 is a schematic view showing flow of a refrigerant in an external heat exchanger-defrosting mode of the heat pump system according to an embodiment of the present disclosure.

When the cooling mode and the battery cooling mode of the air conditioning mode are simultaneously performed, as shown in FIG. 7, it may be possible to decrease the temperature of a battery by decreasing the temperature of the refrigerant discharged from the external heat exchanger 130 through expanding, using the battery chiller 190 disposed between the external heat exchanger 130 and the intermediate heat exchanger 140.

A second expansion device 191 is mounted in the pipeline through which the refrigerant discharged from the external heat exchanger 130 flows into the battery chiller 190 such that the battery chiller 190 can function as an evaporator by expanding the refrigerant. A check valve 192 for preventing backflow of a refrigerant may be mounted in the pipeline through which a refrigerant is discharged from the battery chiller 190.

The case in which the cooling mode is operated corresponds to summertime for which the outdoor temperature is high, and in this case, the temperature of a battery increases and the battery efficiency decreases. Accordingly, the second expansion device 191 is partially opened such that a refrigerant flows and expands, the expanding refrigerant cools the cooling water in a battery cooling/heating cooling water circuit while passing through the battery chiller 190 that functions as an evaporator, and the cooling water is circulated to a cooling plate of a battery pack, thereby preventing the battery pack from being overheated. In this case, the second expansion device 191 may be an electric opening/closing expansion valve or an electronic expansion valve. As for the valve, when the temperature of battery or a battery pack increases higher than a second battery setting temperature, the electronic expansion valve 191 is opened such that the battery cooling mode is also operated, so an expanding refrigerant cools the cooling water in the battery cooling circuit while passing through the battery chiller 190 that functions as an evaporator and the cooling water is circulated to a cooling plate of the battery pack, thereby preventing the battery pack from being overheated. Further, when the temperature of a battery decreases lower than a first battery setting temperature with the cooling mode in operation, the electronic expansion valve 191 can be closed such that the battery cooling mode is not operated.

In an embodiment of the present disclosure, the first setting temperature and the setting temperature that are the reference for changing the battery cooling mode may be 30~35 degrees and 35~37 degrees, respectively.

Accordingly, the refrigerant that has condensed through the external heat exchanger 130 expands through the first expansion device 170 and the second expansion device 190 and then flow at a low temperature into the internal heat exchanger 140 and the battery chiller 190, thereby being able to cool air flowing in the HVAC unit and cool a battery.

In particular, in the present disclosure, since a refrigerant is distributed at the first divergent point 181 right before entering the intermediate heat exchanger 181 and the refrigerants that have passed through the battery chiller join at the second divergent point 182 at which the refrigerants have passed through the 4-way valve after passing through the internal heat exchanger, a relatively less refrigerant flows into the intermediate heat exchanger 181 and exchanges heat therein, so the refrigerant flowing into the internal heat exchanger 140 flows into an expansion device at a low temperature, that is, in a well liquefied state. Further, it is possible to expect, from this difference, an operation effect of decreasing the reason of noise in the expansion device installed right before a front panel separates an engine room and a passenger room, adjacent to the HVAC module that is usually positioned in the interior of a vehicle.

Finally, the case in which only the battery cooling operation is performed by the heat pump system for a vehicle of the present disclosure is described.

When only the battery cooling operation is performed, a refrigerant is controlled to flow in order of "compressor 110—4-way valve 120—electric part cooling circuit 160 (the refrigerant/electric part cooling water heat exchanger 161 functioning as a water cooling type condenser)—external heat exchanger 130 (functioning as a condenser)—second expansion device 191 battery chiller 190 (functioning as an evaporator)—check valve 192—intermediate heat exchanger 180—accumulator 150—compressor 110".

In this case, the first expansion device 170 such as an electronic expansion valve is closed, thereby preventing a refrigerant from flowing to the internal heat exchanger 140 from the intermediate heat exchanger 180.

Further, the second expansion device (EEV) 191 installed by dividing the refrigerant line connecting external heat exchanger 130 and the intermediate heat exchanger 180 to each other is opened (which means that a channel is opened with a set expansion ratio) such that the refrigerant discharged from the external heat exchanger 130 expands and flows into the battery chiller 190.

In more detail, in the same way as the case in which the cooling mode and the battery cooling mode are simultaneously performed, as described above, an expanding refrigerant cools the cooling water in the battery cooling/heating cooling water circuit while passing through the battery chiller 190 that functions as an evaporator, the cooling water is circulated to a cooling plate of a battery pack, thereby preventing the battery pack from being overheated. In this case, the second expansion device 191 may be an electric opening/closing expansion valve or an electronic expansion valve. As for the valve, when the temperature of a battery or a battery pack increases higher than a second battery setting temperature, the electronic expansion valve 191 is opened such that the battery cooling mode is also operated, so an expanding refrigerant cools the cooling water in the battery cooling circuit while passing through the battery chiller 190 that functions as an evaporator and the cooling water is circulated to a cooling plate of the battery pack, thereby preventing the battery pack from being overheated. Further, when the temperature of a battery decreases lower than a first battery setting temperature with the cooling mode in operation, the electronic expansion valve 191 can be closed such that the battery cooling mode is not operated. In an embodiment of the present disclosure, the first setting temperature and the setting temperature that are the reference for changing the battery cooling mode may be 30~35 degrees and 35~37 degrees, respectively.

The heat pump system of the present disclosure, using this configuration, can prevent a refrigerant from flowing to the internal heat exchanger 140 in the HVAC unit and can apply a heat pump cycle only to the battery chiller, thereby being able to cool only a battery without operating an air conditioning system.

As described above, according to the heat pump system for a vehicle of the present disclosure, since there are provided a 4-way valve, a compressor, an external heat exchanger, and an internal heat exchanger that perform specific functions, respectively, it is possible to easily change air conditioning modes, simplify pipelines and devices for the air conditioning modes, respectively, and improve heating efficiency and battery operation performance. Further, it is possible to achieve all of the air conditioning modes described above even by installing a heater core 103 and an internal heat exchanger 140 that receive cooling water heated by an electric cooling water heater 104 in an HVAC unit. Accordingly, there is an effect that it is possible to use an HVAC module having two heat exchangers that was developed for internal combustion engine vehicles as an HVAC module for electric vehicles even without specifically changing a design.

Only a specific embodiment was described in the above detailed description. However, the present disclosure should not be construed as being limited to the specific type described above and should be understood as including all modifications, equivalents, and substitutes that are included in the spirit and scope of the present disclosure that are defined by claims.

DESCRIPTION OF REFERENCE NUMERALS

- 100: heat pump system
- 101: HVAC module
- 102: blower fan)
- 103: heater core
- 104: electric cooling water heater
- 105: pump
- 106: cooling water reservoir tank
- 110: compressor
- 120: 4-way valve
- 121: first port of 4-way valve
- 122: second port of 4-way valve
- 123: third port of 4-way valve
- 124: fourth port of 4-way valve
- 130: external heat exchanger
- 140: internal heat exchanger
- 141: first port of internal heat exchanger
- 142: second port of internal heat exchanger
- 150: accumulator
- 160: electric part cooling circuit
- 161: refrigerant/electric part cooling water heat exchanger
- 162: electric part cooling water channel
- 163: electric part radiator
- 164: electric part cooler
- 165: electric part cooling water circulation pump
- 166: electric part cooling water 3-way valve
- 167: electric part cooling water bypass channel
- 168: cooling fan
- 170: first expansion device
- 180: intermediate heat exchanger
- 190: battery chiller
- 191: second expansion device
- 192: check valve

The invention claimed is:

1. A heat pump system for a vehicle, comprising:
a compressor (110) configured to compress and discharge a refrigerant;
a 4-way valve (120) configured to transmit a refrigerant, which is discharged from the compressor (110), to an external heat exchanger (130) or an internal heat exchanger (140), depending on air conditioning modes;
the external heat exchanger (130) configured to perform heat exchange between a refrigerant transmitted from the compressor (110) or the internal heat exchanger (140) and air outside the vehicle;
the internal heat exchanger (140) configured to enable a refrigerant transmitted from the external heat exchanger (130) to exchange heat with air that is supplied into an HVAC unit or enables a refrigerant discharged from the compressor (110) to exchange heat with air that is supplied into the vehicle;
an electric part cooling circuit (160) mounted adjacent to the external heat exchanger (130) and configured to absorb and discharge heat, which is generated from electric parts mounted in the vehicle, to the outside, depending on the air conditioning modes;
a refrigerant/electric part cooling water heat exchanger (161) mounted between the external heat exchanger (130) and the 4-way valve (120) and configured to enable heat exchange between a refrigerant that is discharged from the external heat exchanger (130) and cooling water that flows through an electric part cooling water channel (162); and
a first expansion valve (170) disposed in a refrigerant line going to or coming from the internal heat exchanger (140) to be able to expand a refrigerant, depending on the air conditioning modes,
wherein the 4-way valve (120) has:
a first port (121) of the 4-way valve configured to function as a refrigerant inlet into which a refrigerant discharged from the compressor (110) always flows regardless of the air conditioning modes:
a second port (122) of the 4-way valve (120) that is a refrigerant inlet/outlet that selectively communicates with the first port and a third port, depending on the air conditioning mode, and is connected to the internal heat exchanger (140) disposed in the HVAC unit;
the third port (123) of the 4-way valve (120) that is a refrigerant outlet that selectively communicates with the second port and a fourth port, depending on air conditioning modes, and is connected to the compressor in flow of a refrigerant; and
the fourth port (124) of the 4-way valve that is a refrigerant inlet/outlet that selectively communicates with the first port and the third port, depending on the air conditioning modes, and is connected to the refrigerant/electric part cooling water heat exchanger (161),
a first divergent point (181) at which refrigerants separate or join each other at a side of the external heat exchanger (130) in a refrigerant line connecting the external heat exchanger (130) and the internal heat exchanger (140) without the 4-way valve (120), and a second divergent point (182) at which refrigerants separate or join each other at a side of the 4-way valve (120) in a refrigerant line connecting the third port (123) of the 4-way valve (120) and the compressor (110) are provided,
- wherein a battery chiller (190) is mounted in a separate refrigerant line connecting the first divergent point (181) and the second divergent point (182), and a second expansion valve (191) is mounted in a pipeline through which a refrigerant discharged from the external heat exchanger (130) flows into the battery chiller (190), so the refrigerant discharged from the external heat exchanger (130) is sent into the second expansion valve (191) and cools a battery, depending on air conditioning mode, and a check valve (192) configured to prevent backflow of a refrigerant is disposed in a pipeline through which a refrigerant is discharged from the battery chiller (190),
- an intermediate heat exchanger (180) which is additionally disposed between the first divergent point (181) of a refrigerant line, which connects the external heat exchanger (130) and the internal heat exchanger (140), and the internal heat exchanger (140), wherein the intermediate heat exchanger (180) is provided for heat exchange between refrigerants that have passed and have not passed yet through the first expansion valve (170) and the internal heat exchanger (140), respectively, and the second divergent point (182) is positioned before the intermediate heat exchanger (180) to further increase the degree of super heat and performance of the refrigerant coming out of the battery chiller,
- a heater core (103) that is supplied with cooling water heated by an electric cooling water heater (104) and is mounted at a position of a heater core, which obtains heat from waste heat of an engine, of an existing HVAC unit for an internal combustion engine, wherein the heater core (103) is disposed in a channel configured to supply air into the vehicle and is controlled to apply heat to air that is supplied into the vehicle when the air conditioning mode is a heating mode, a dehumidifying mode, or a defrosting mode,
- the electric part cooling circuit (160) which is controlled to operate when the air conditioning mode of the heat pump system is the heating mode or a cooling mode, wherein the refrigerant electric part cooling water heat exchanger (161) of the electric part cooling circuit (160) is operated as a water cooled condenser using electric part cooling water in the cooling mode and as an evaporator absorbing heat from electric parts in the heating mode, an electric part cooling 3-way valve (166) is operated such that the electric part cooling water flows to the refrigerant/electric part cooling water heat exchanger (161) when temperature of the electric part cooling water is less than a set temperature, and the electric part cooling 3-way valve (166) is operated such that the electric part cooling water flows to an electric part cooling water bypass channel (167) rather than flowing to the refrigerant electric part cooling water heat exchanger (161) when temperature of the electric part cooling water is greater than the set temperature, wherein the set temperature is set to a value within a temperature range of 70~80 degrees Celsius,
- wherein when temperature of a battery increases higher than a second battery setting temperature with the cooling mode in operation, the second expansion valve (191) is opened such that a battery cooling mode is also operated, so an expanding refrigerant cools cooling water in a battery cooling circuit while passing through the battery chiller (190) that functions as an evaporator and the cooling water is circulated to a cooling plate of the battery pack, thereby preventing the battery pack from being overheated,
- wherein when temperature of the battery decreases lower than a first battery setting temperature with the cooling mode in operation, the second expansion valve (191) is closed such that the battery cooling mode is not operated, and
- wherein when frost on the external heat exchanger (130) is sensed and the defrosting mode is operated, operation of a cooling fan (168) and the electric part cooling water circulation pump (165) is stopped in order to increase temperature of a refrigerant that is supplied to the external heat exchanger (130), and an internal/external air mode is operated into an internal air mode or a partial external air state, and cooling water heated by the electric cooling water heater (104) is circulated into the HVAC unit for a heating function.

2. The heat pump system of claim 1, wherein the internal heat exchanger (140) includes:
- a first port (141) of the internal heat exchanger (140) through which a refrigerant that has absorbed heat from air that is supplied into the vehicle is discharged or through which a refrigerant for providing heat to air that is supplied into the vehicle flows inside, depending on the air conditioning modes; and
- a second port (142) of the internal heat exchanger (142) through which a refrigerant that absorbs heat from air that is supplied into the vehicle flows inside or through which a refrigerant that has provided heat to air that is supplied into the vehicle is discharged, depending on the air conditioning modes.

3. The heat pump system of claim 1, wherein when the internal heat exchanger (140) functions as an evaporator, depending in the air conditioning modes, a refrigerant that has passed through the first expansion valve (170) flows into the second port (142) of the internal heat exchanger (140) such that a refrigerant transmitted from the external heat exchanger (130) expands through the first expansion valve (170) and exchanges heat with air that is supplied into the vehicle.

4. The heat pump system of claim 1, wherein when the internal heat exchanger (140) functions as a condenser, depending in the air conditioning modes, a refrigerant discharged from the compressor (110) flows into the first port (141) of the internal heat exchanger (140) such that the refrigerant discharged from the compressor (110) expands and exchanges heat with air that is supplied into the vehicle.

5. The heat pump system of claim 1, wherein the electric part cooling circuit (160) includes:
- an electric part radiator (163) mounted adjacent to the external heat exchanger (130) and configured to enable a refrigerant flowing through the electric part cooling water channel (162) to exchange heat with the external heat exchanger (130);
- an electric part cooling water channel (162) configured to form the refrigerant electric part cooling water heat exchanger (161) and the electric part radiator (163) into one cooling water channel, and equipped with an electric part cooler (164) configured to absorb heat generated from electric parts mounted in the vehicle and an electric part cooling water circulation pump (165) configured to generate flow of cooling water in one direction are mounted;

the electric part cooling water bypass channel (167) formed on the electric part cooling water channel (162) such that cooling water that has passed through the electric part cooler (164) directly flows to the electric part radiator (163) without passing through the refrigerant/electric part cooling water heat exchanger (161); and the electric part cooling water 3-way valve (166) mounted at a joint at which the electric part cooling water channel (162) and the electric part cooling water bypass channel (167) communicate with each other, and configured to selectively send cooling water, which has passed through the electric part cooler (164), to the electric part cooling water bypass channel (167) or the refrigerant/electric part cooling water heat exchanger (161), depending on the air conditioning modes.

6. The heat pump system of claim 1, wherein:

when temperature of the electric part cooling water is less than the set temperature as the cooling mode in an external air temperature condition that does not require battery cooling, the electric part cooling water flows to the refrigerant/electric part cooling water heat exchanger (161) through the cooling water circulation pump (165), the electric part cooler (164), and the electric part cooling 3-way valve (166), and when temperature of the electric part cooling water is greater than the set temperature, the electric part cooling 3-way valve (166) is operated, sending the electric part cooling water, which has passed through the electric part cooler (164), directly to the electric part radiator (163) through the electric part cooling water bypass channel (167).

7. The heat pump system of claim 1, wherein the first battery setting temperature and the second battery setting temperature that are reference for changing the battery cooling mode is 30~35 degrees Celsius and 35~37 degrees Celsius, respectively.

8. The heat pump system of claim 1, further comprising an accumulator (150) mounted between the intermediate heat exchanger (180) and the compressor (110) and configured to transmit a refrigerant that has passed through the intermediate heat exchanger (180) to the compressor (110).

* * * * *